Figure 1:
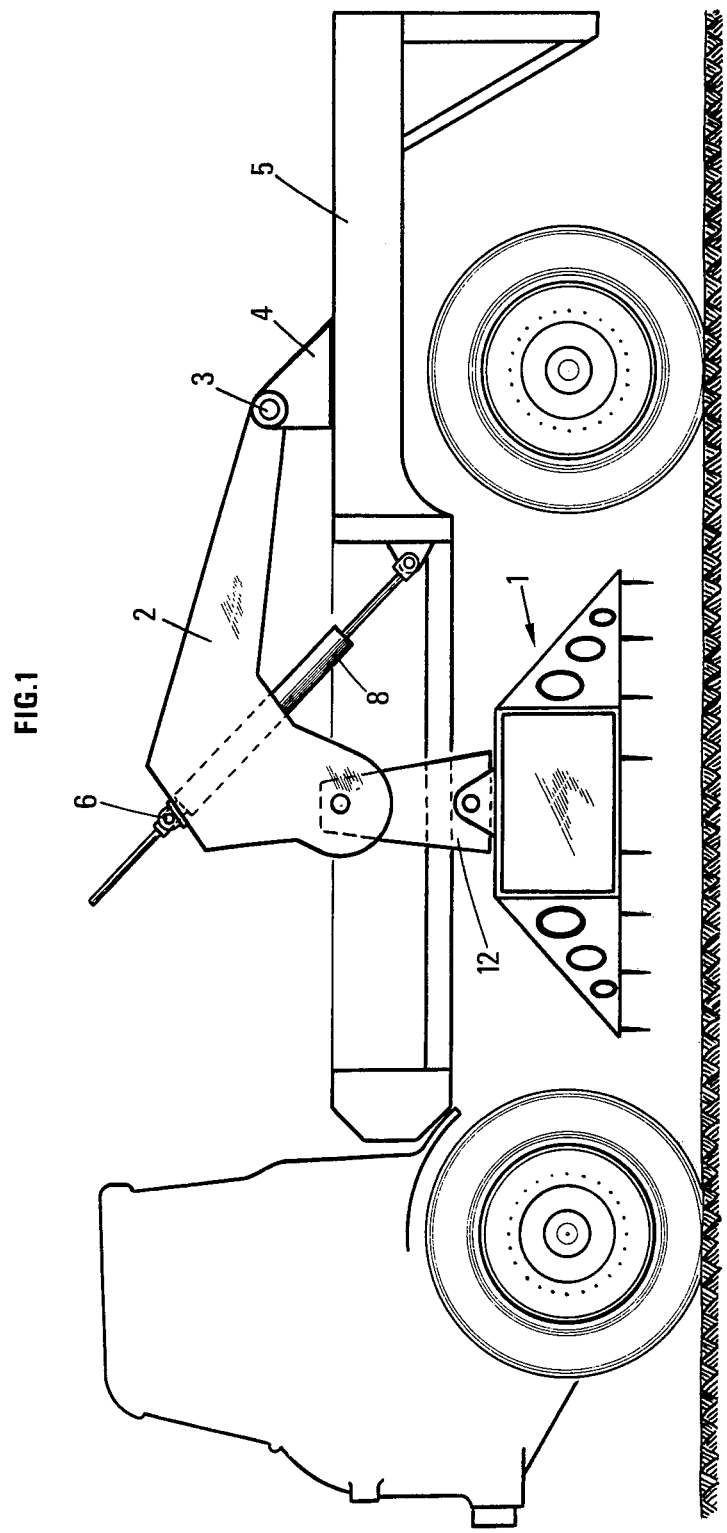

United States Patent [19]

Cholet et al.

[11] 4,050,540

[45] Sept. 27, 1977

[54] MOVABLE DEVICE FOR GENERATING ACOUSTIC SHEAR WAVES IN THE EARTH

[75] Inventors: Jacques Cholet, Rueil-Malmaison; Pierre-Claude Layotte, La Palmyre, both of France

[73] Assignee: Institut Francais du Petrole, France

[21] Appl. No.: 589,676

[22] Filed: June 24, 1975

[30] Foreign Application Priority Data

June 27, 1974 France .................. 74.22569

[51] Int. Cl.² .................. G01V 1/14
[52] U.S. Cl. .................. 181/114; 181/121; 340/15.5 SW; 181/401
[58] Field of Search .................. 181/113, 114, 116, 117, 181/119, 121, 401; 340/15.5 SW; 173/81, 93.5, 94, 95

[56] References Cited

U.S. PATENT DOCUMENTS

| | | | |
|---|---|---|---|
| 2,740,488 | 4/1956 | Heaps | 340/15.5 SW |
| 3,205,971 | 4/1965 | Clynch | 181/401 |
| 3,372,770 | 3/1968 | Clynch | 181/401 |
| 3,587,774 | 6/1971 | Bemrose et al. | 181/401 |
| 3,716,111 | 2/1973 | Lavergne | 181/113 |
| 3,835,954 | 9/1974 | Layotte | 181/116 |

*Primary Examiner*—Howard A. Birmiel
*Attorney, Agent, or Firm*—Craig & Antonelli

[57] ABSTRACT

Device for generating shear waves in the earth for seismic prospecting, comprising means for striking with a mass a target-member coupled to the earth, said means including means for lifting and shifting said mass with respect to the target member, an electromagnet for intermittently locking it in an upper position and releasing it abruptly and means for adjusting the stroke of the mass from its upper position to its lower position where it impinges the target member.

25 Claims, 20 Drawing Figures

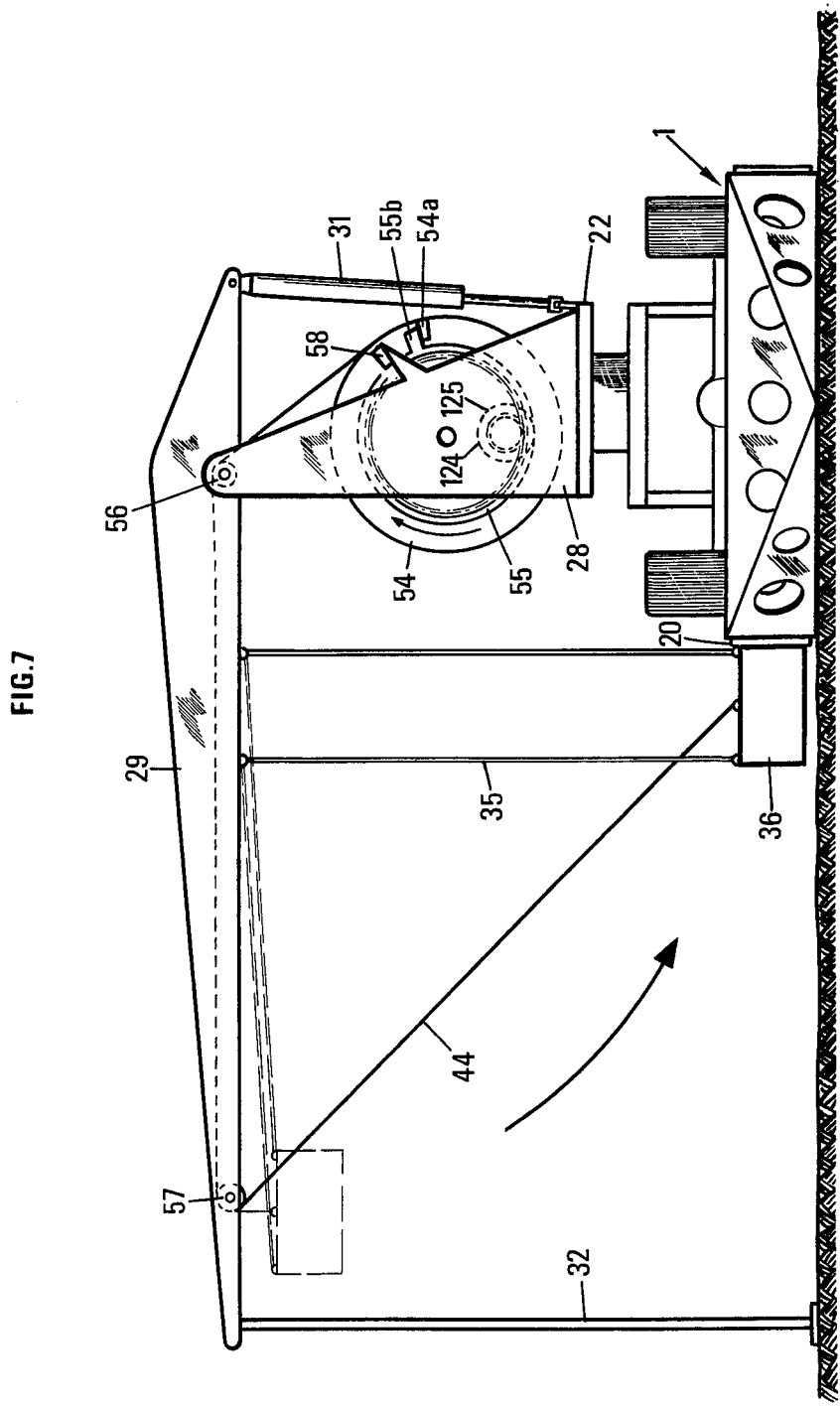

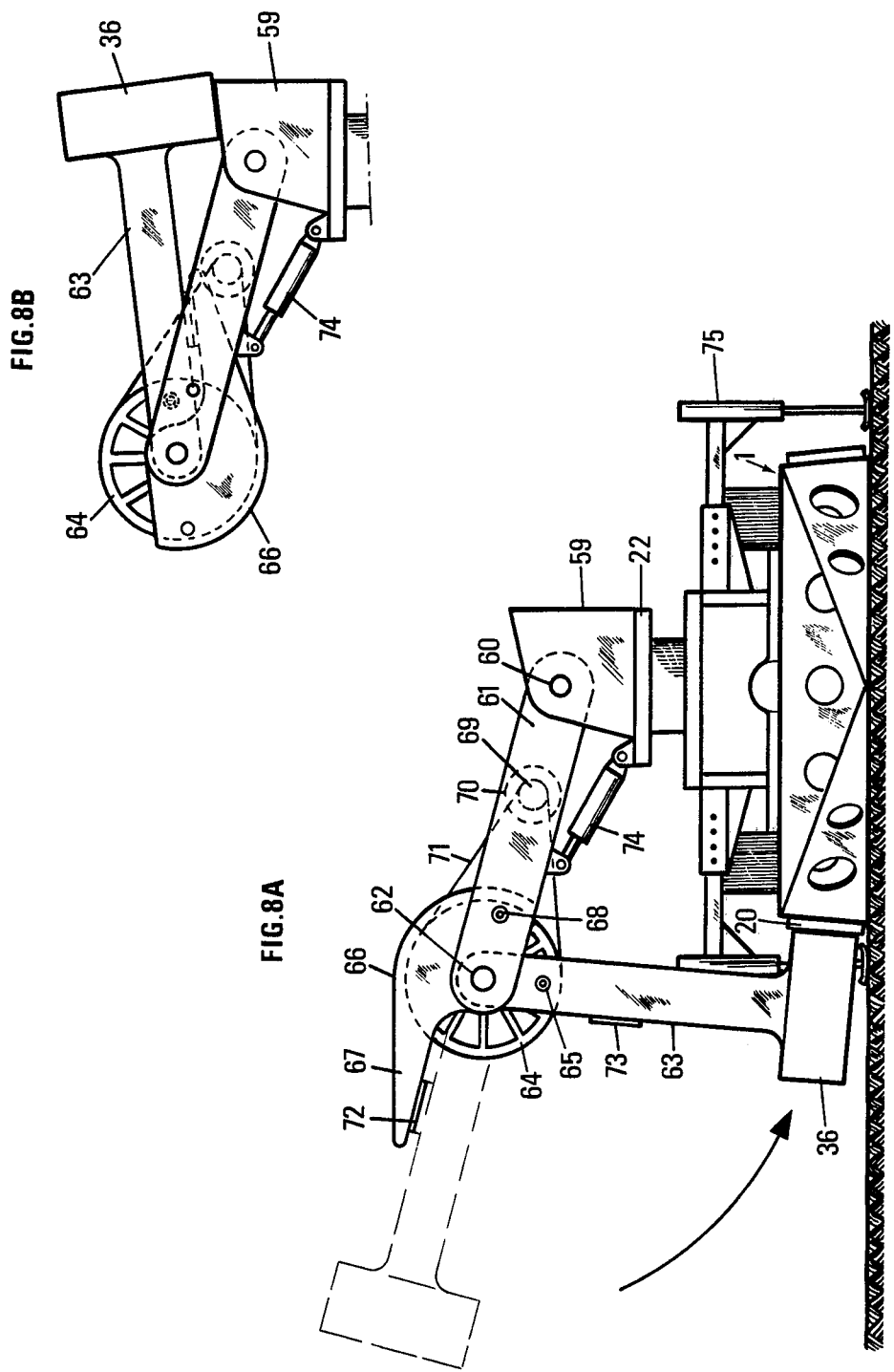

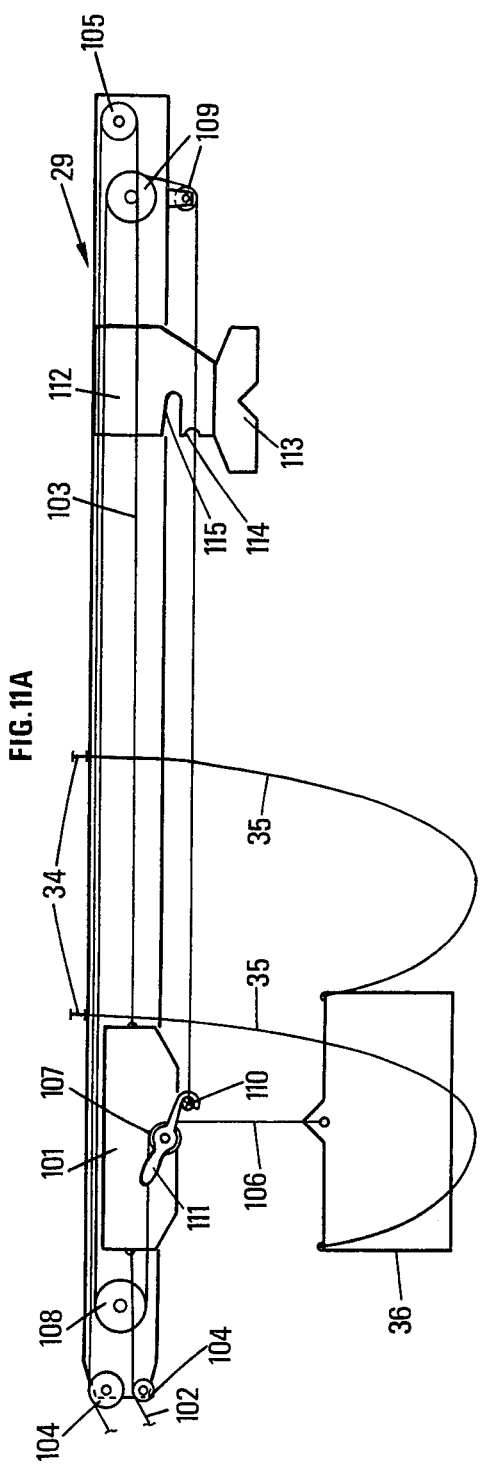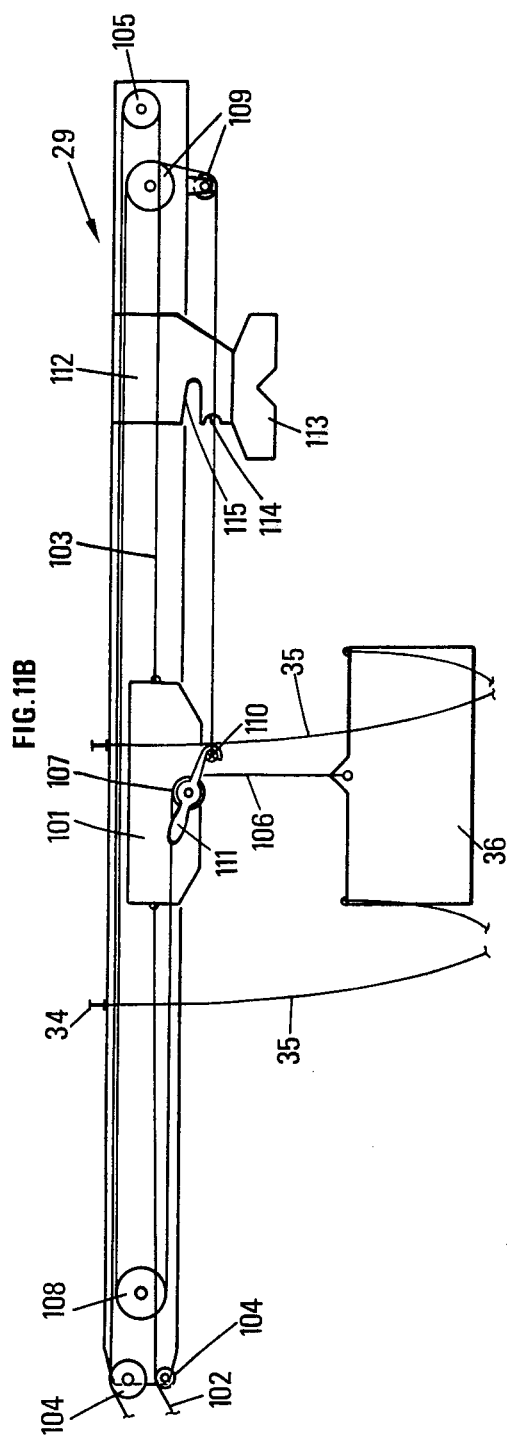

FIG.11C

FIG.11D

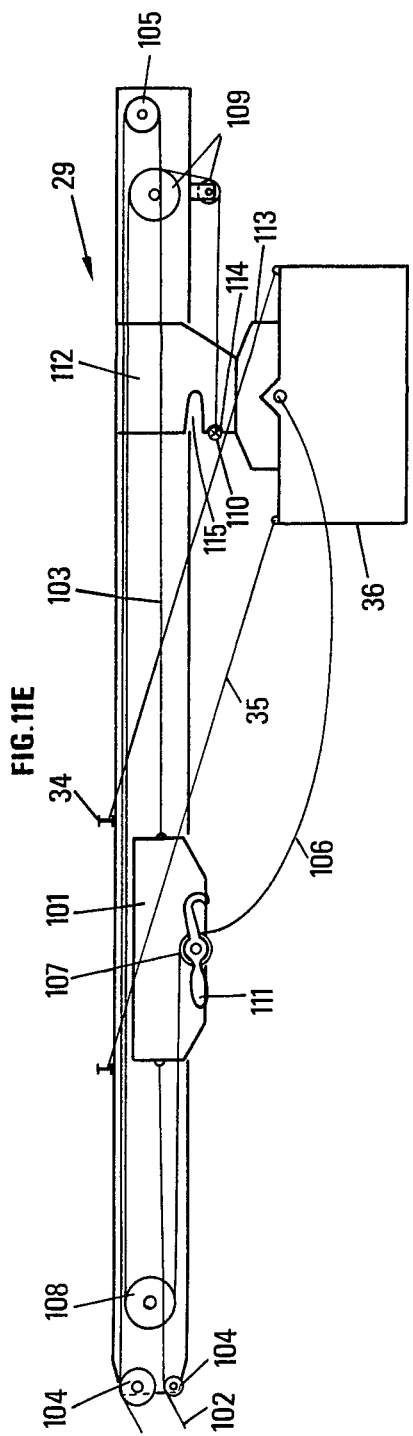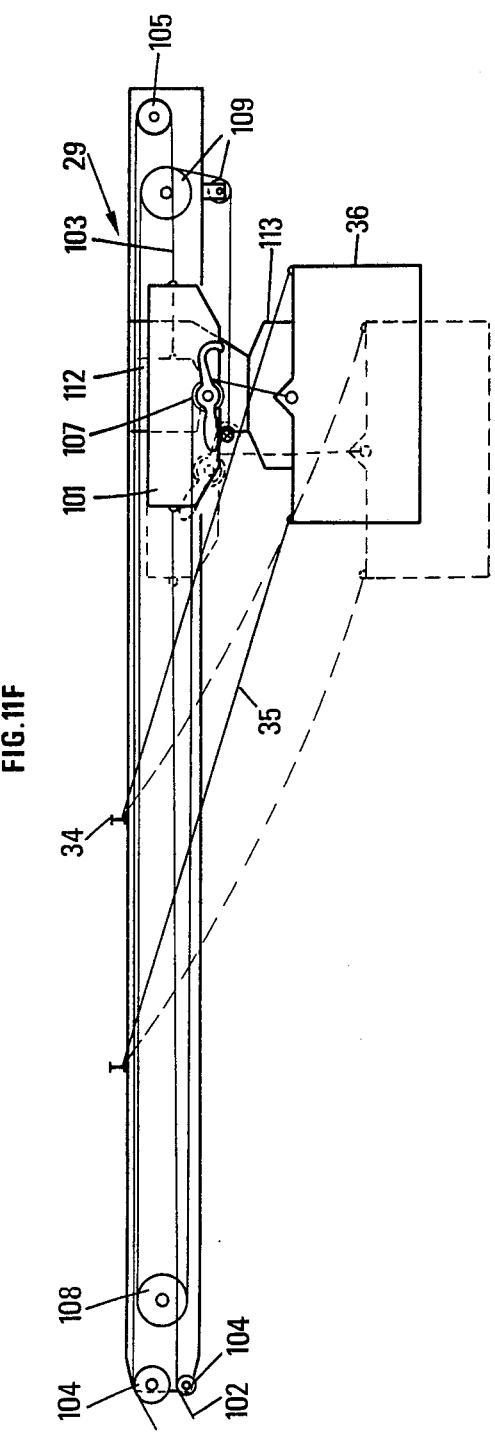

MOVABLE DEVICE FOR GENERATING ACOUSTIC SHEAR WAVES IN THE EARTH

This invention relates to a movable device for generating acoustic shear waves in the earth at a high recurrence frequency.

Seismic prospecting makes use mainly of so-called longitudinal acoustic waves which propagate in depth according to an expansion mode. It is also possible to make use of acoustic waves propagating in depth according to a distorsion mode, which are usually called shear waves. Two types of shear waves can be defined:

the shear waves imparting to the particles a horizontal motion whose detected component is perpendicular to the vertical plane passing through the seismic profile, and which are called SH waves, the shear waves which impart to the particles a horizontal motion whose detected component is contained in the vertical plane passing through the seismic profile, and which are called SV waves.

The use of acoustic shear waves is of particular interest. As a matter of fact, shear waves having, at equal frequency, a lower wavelength than the longitudinal waves, have, accordingly, a better separating power. In addition, SH waves have the particular feature, under certain conditions, of not undergoing any conversion in the presence of stratigraphic discontinuities. The recordings obtained from these waves are accordingly much more simple.

The simultaneous use of longitudinal and shear waves has the further advantage of making possible the determination of certain physical parameters of the rocks, such as Young's modulus, Poisson's coefficient, rigidity modulus and compressibility modulus, whose value is very useful to know, particularly in regard to geotechniques.

Among the devices adapted to generate shear waves in the earth, we can mention those described in the U.S. Pat. Nos. 3,159,233 and 3,286,783, relating to horizontal vibrators imparting horizontal alternative movements by friction to the surface on which they are applied. The disadvantage of these devices is that the pulses transmitted from these vibrators are of long duration, generally several seconds. It is then necessary to subject the corresponding recordings to a mathematical conversion for making them similar to those corresponding to short pulses.

Another known process, as described for example in U.S. Pat. No. 2,740,488, consists of throwing forward a mass against a stop member fastened to the earth. The disadvantage of this type of device is that it requires, for being performed, long preliminary operations for anchoring the stop member in the earth and, accordingly, the rate of repetition of the successive shocks generated at two different places of a seismic profile on survey is necessarily very slow.

It is an object of this invention to provide a movable device for generating in the earth acoustic shearwaves. It comprises a target member provided with a surface coupled to the earth, a mass for striking the target member, movable means connected to said mass for imparting thereto a velocity of determined amplitude, having a component parallel to the coupling surface and whose direction is adjustable with respect to the target member.

Said means may comprise actuating members movable with respect to a stationary axis for maintaining the mass in a predetermined plane containing the target-member and control means for imparting to the mass a potential energy and orienting its fall in the direction of the target-member.

Figure 2:
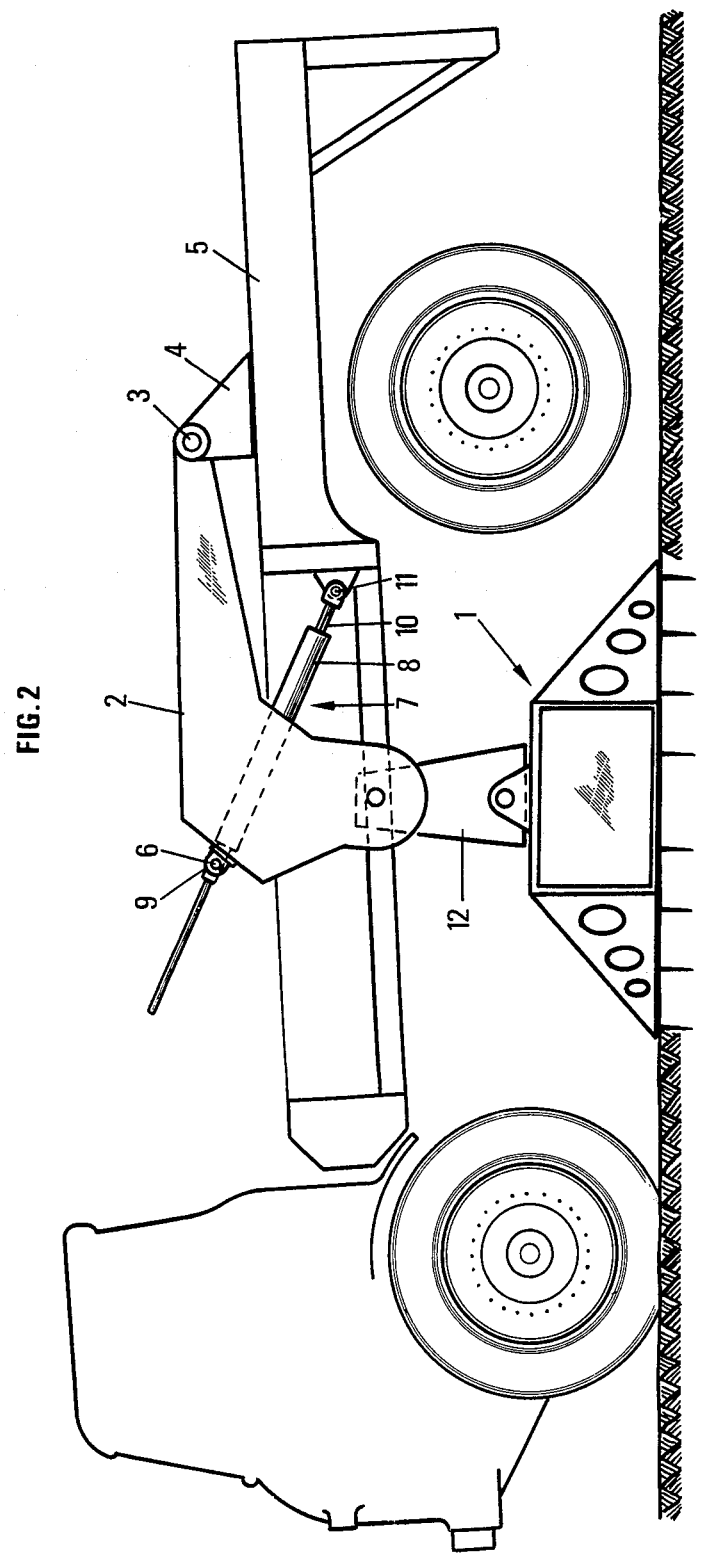
Figure 3:
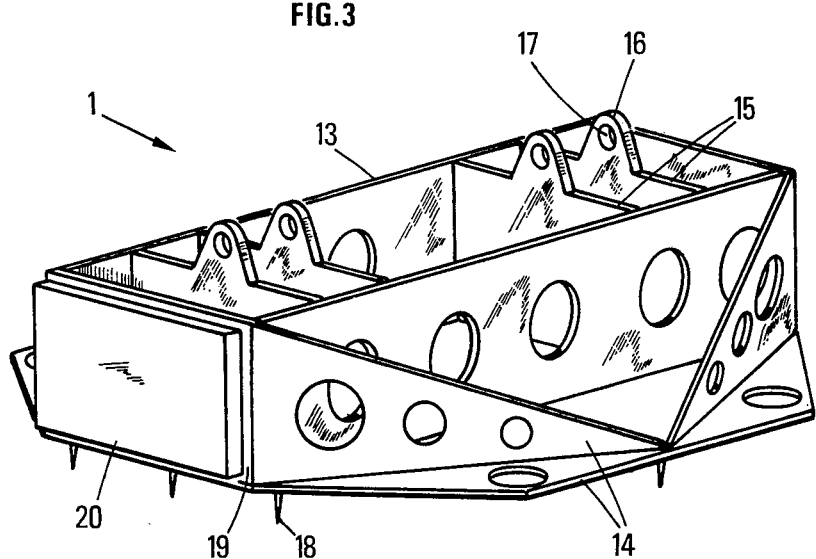
Figure 10:
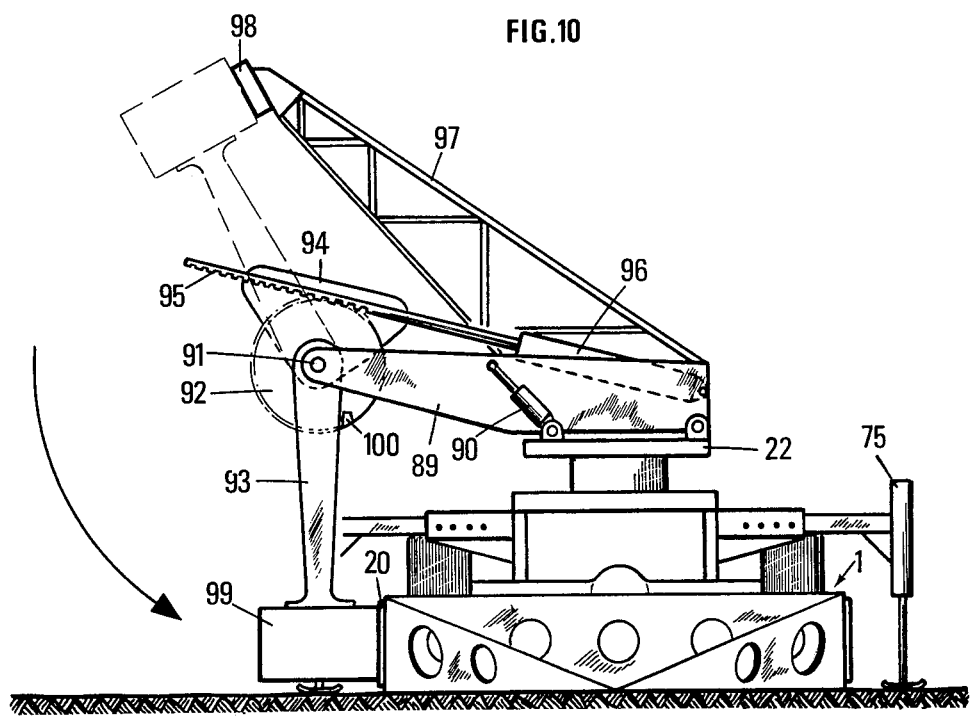
Figure 4:
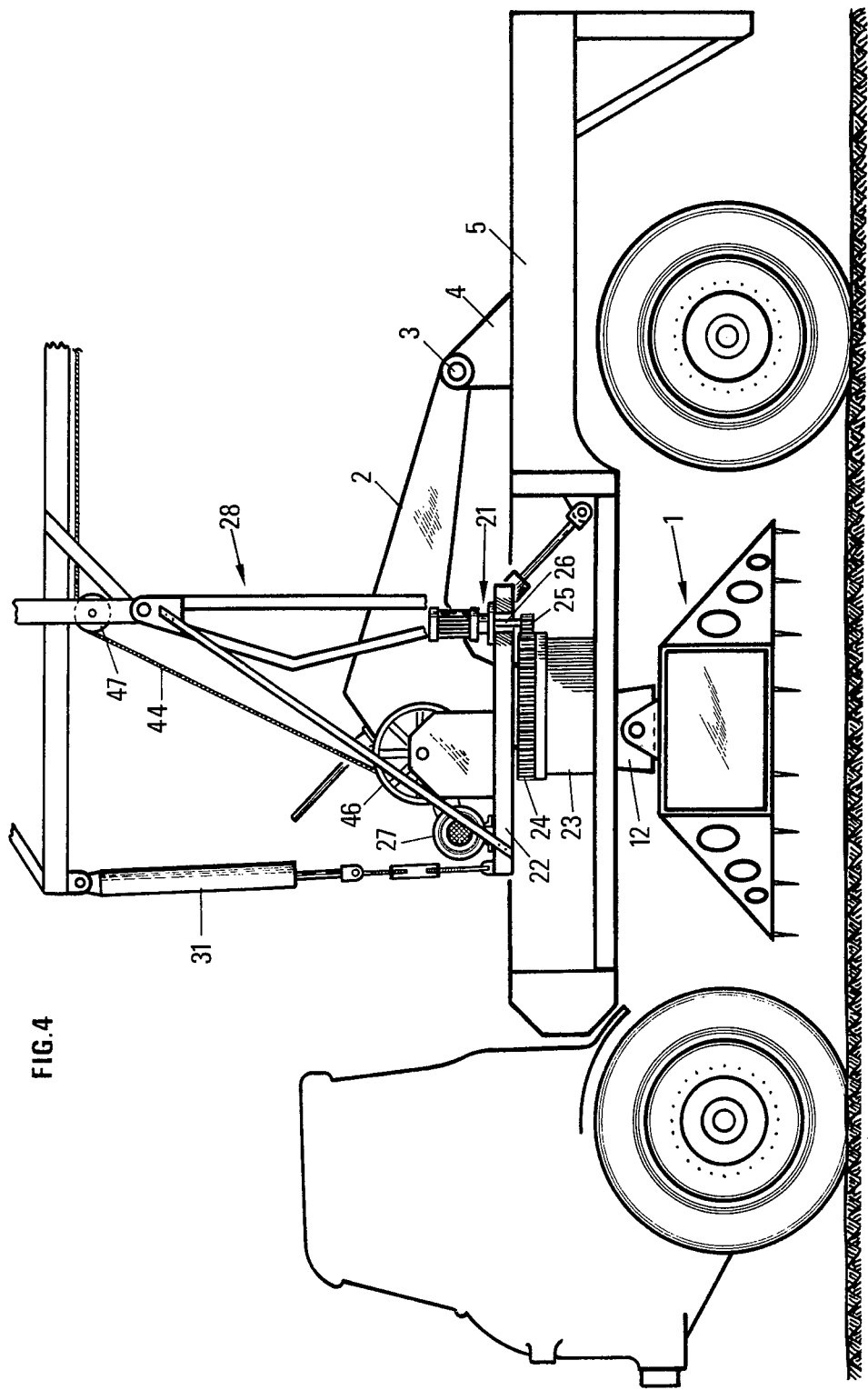
Figure 5:
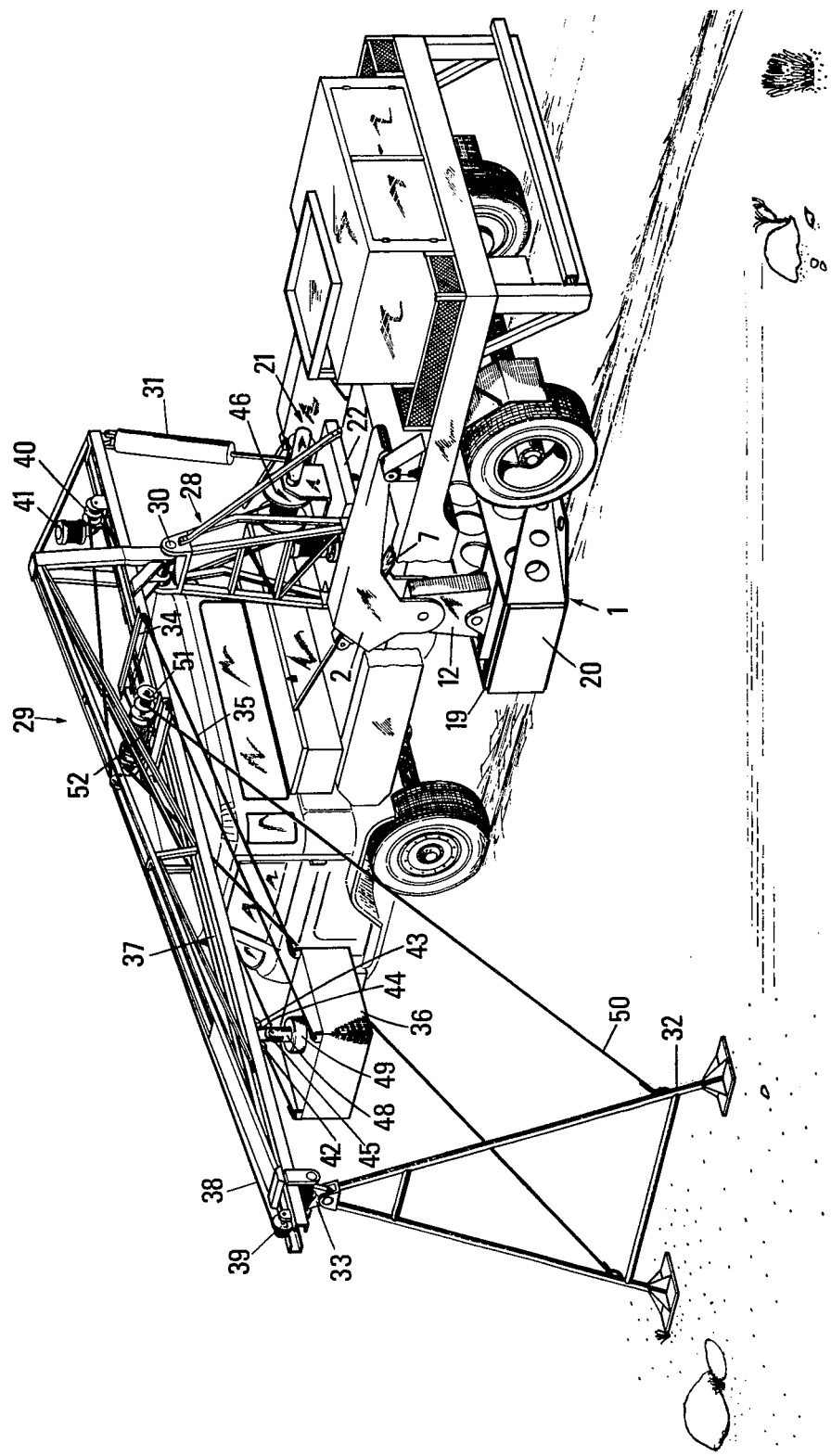
Figure 6A:
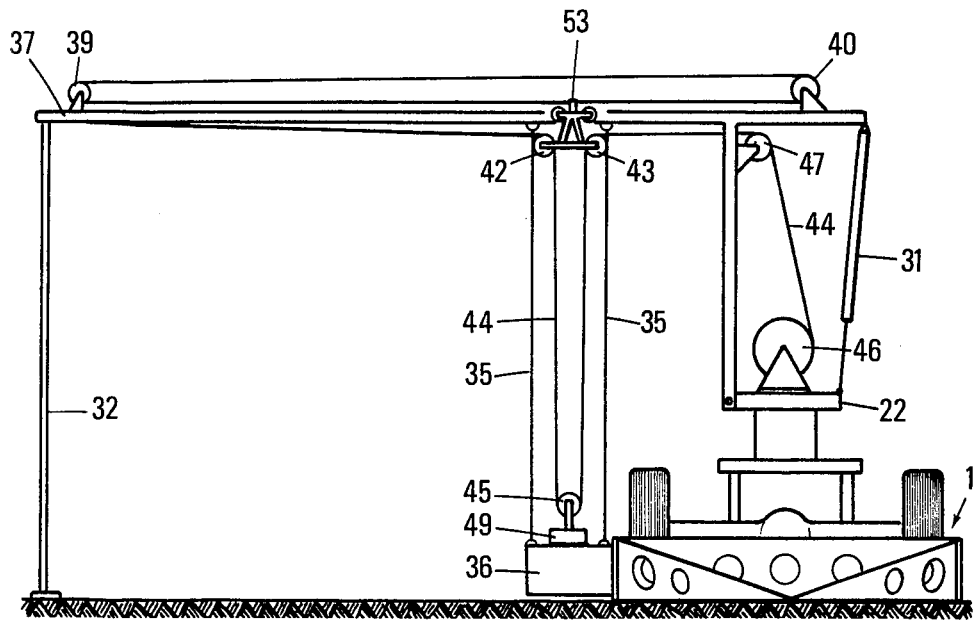
Figure 6B:
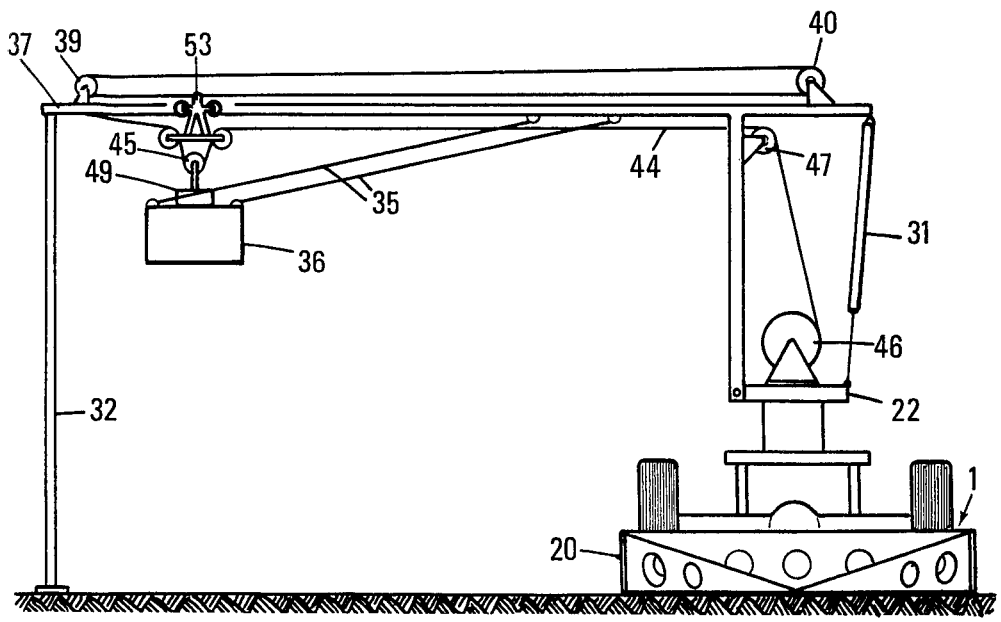
Figure 6C:
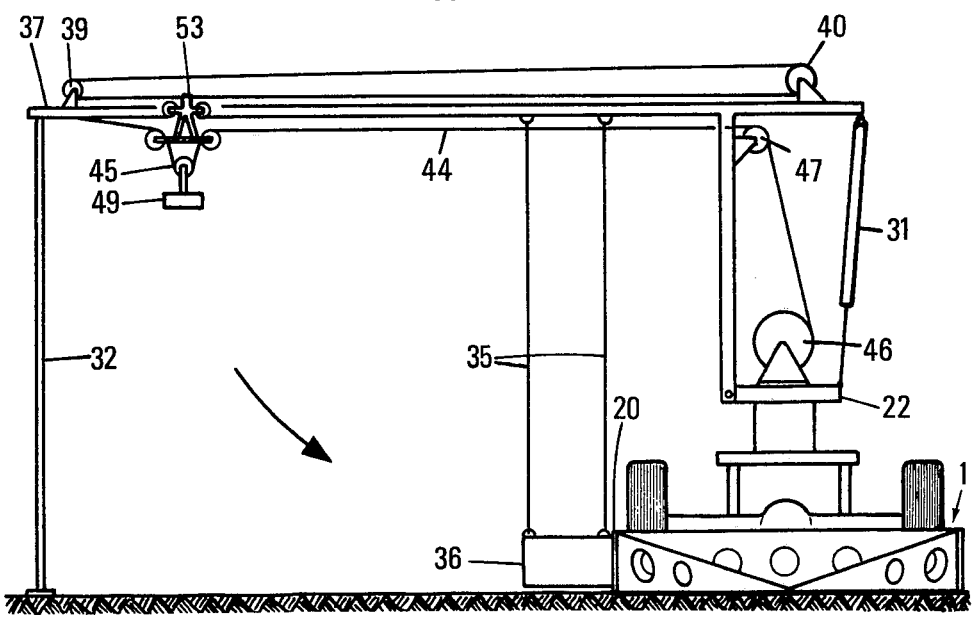
Figure 12:
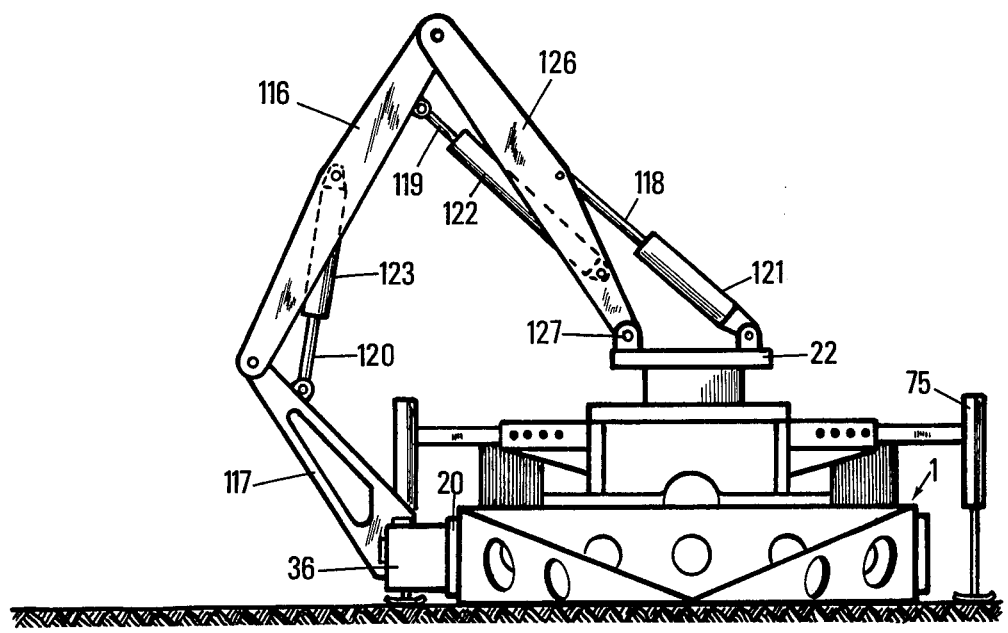
Figure 9:
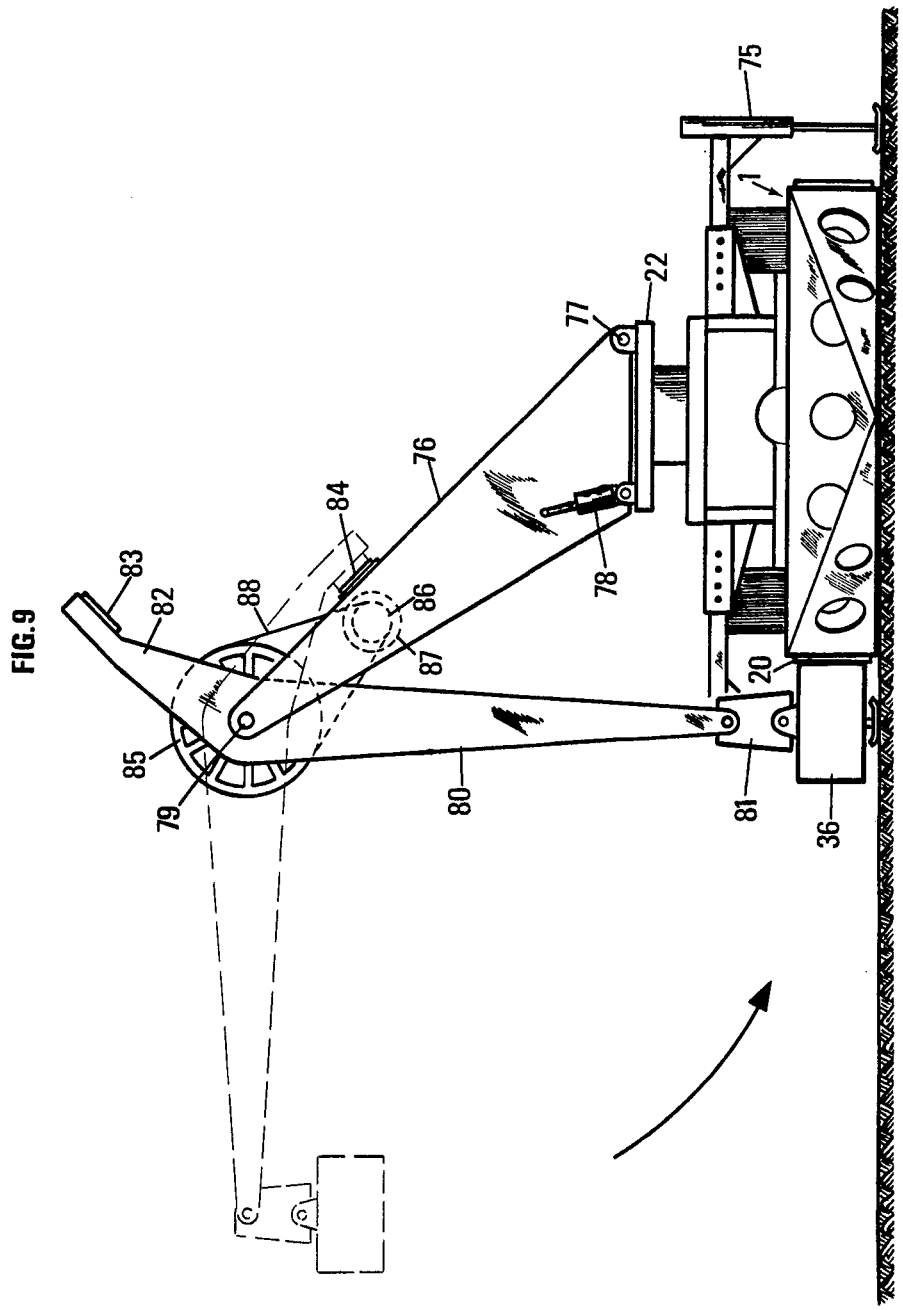

Other features and advantages of the invention will appear from the following description given with reference to the accompanying drawings wherein:

FIG. 1 diagrammatically shows, in raised position, the movable system whereby the target-member can engage intermittently the earth, FIG. 2 diagrammatically shows the system of FIG. 1 in a position where the target-member is pressed against the earth, FIG. 3 diagrammatically shows the target-member, FIG. 4 diagrammatically shows the movable actuating means comprising a turret pivotally mounted on the plate of a vehicle, FIG. 5 diagrammatically shows a first embodiment of the actuating members and of the control means, FIGS. 6A, 6B and 6C show a kinematic chain of the embodiment according to FIG. 5, FIG. 7 diagrammatically shows a second embodiment of the actuating members and of the control means, FIGS. 8A and 8B diagrammatically show a third embodiment of the actuating members and of the control means, FIG. 9 diagrammatically shows a fourth embodiment of the actuating members and of the control means, FIG. 10 diagrammatically shows a fifth embodiment of the actuating members and of the control means, FIGS. 11A to 11F diagrammatically show a kinematic chain of a sixth embodiment of the actuating members and of the control means, and, FIG. 12 diagrammatically shows a seventh embodiment of the actuating members and of the control means.

The movable system whereby the target-member 1 engages the earth, as illustrated in FIGS. 1 and 2, comprises two arms 2 articulated at one of their ends onto a shaft 3 carried by a connecting member 4 solid (solidly affixed) with the plate 5 of a truck. The arms 2 are bent at the vicinity of their other ends. At the level of each bend, an axle 6, solid with the body 8 of a hydraulic jack 7, is rotatable in a sleeve 9 solid with each arm. The piston sliding in the body 8 of the jack is solid with a rod 10 pivotable about an axle 11 solid with the plate of the truck and shifted with respect to the bearing point of shaft 3. The other end of each one of these two arms 2 is solid with two blocks 12 made of elastic material. The target-member 1 is also solid with two blocks 12. The respective locations of the axles whereby the two blocks 12 are made solid with the arms 2 and with the target-member 1 are distinct.

The sliding of the rod 10 with respect to the body of the jack, by the action of a pressurized fluid supplied from a hydraulic motor, not shown, moves the target-member from an upper position where it is not in contact with the earth (FIG. 1) to a lower position where it is in contact therewith.

The target member 1, shown by way of example in FIG. 3, comprises an elongate hollow metal caisson 13 provided with lateral reinforcing webs 14. Inside the caisson are secured two pairs of plates 15 provided with ears 16 at their upper parts. The distance between the two pairs of plates and their spacing are respectively adapted to the spacing between the supporting blocks 12 and to the thickness thereof. Bores 17 are provided through ears 16 for passage of coupling rods whereby the target member can be made solid with the supporting blocks 12. The surface of contact of the target member with the earth is provided with nails 18 for improving the coupling.

Corrugations or ridges may also be provided on the contact surface for still enhancing the coupling effect of the target member with the earth surface. The pressure of fluid injected in the jacks may be such that a portion of the truck weight is applied onto the target member. The end surfaces 19 of the target member on which is applied the mass are provided with rubber plates 20.

The movable actuating means comprise (FIG. 4) a turret 21 including a platform 22, pivotable on a base 23 solid with the plate of the truck and on the periphery of which is secured a toothed ring 24. Platform 22 and base 23 may be made solid with each other in translation in any manner known in the art, for example by means of taper roller bearings. A toothed pinion 25 solid with a shaft 26 passing through platform 22 meshes with the toothed ring 24. Shaft 26 is driven in rotation by motor 27 carried on platform 22, through an assembly of pinions, not shown on the drawings for sake of clarity.

On platform 22 are arranged devices for handling and orienting a mass in the direction of the target member. FIGS. 5 to 10 illustrate different embodiments of such devices.

The embodiment of FIG. 5 comprises a crane, whose mast 28, secured onto the movable platform 22, carries a jib 29 at its upper part. The jib is secured in over-hang on the mast 28 through a horizontal axle 30 and is pivotable in a vertical plane. The end of jib 29 which is closer to axle 30 is secured to the body of an oleo-pneumatic jack 31, fed with pressurized oil and whose rod is itself connected to platform 22. The other end of jib 29 is made solid with a leg 32 through a fastening element 33 with universal joints. On jib 29 are transversely secured two beams 34 to the end of which are fastened four cables 35 of equal length.

At the ends of these cables 35, is fixed a mass 36, preferably shaped as a parallelepiped, at least the upper surface of which is metallic. The jib is provided, at its upper portion with a roller path 37 for a carriage 53 (see FIGS. 6A, 6B or 6C) driven by a cable passing through grooves of lazy pulleys 39 and 40 at the vicinity of the ends of jib 29. Carriage 53 is driven in translation by a motor 41 carried on jib 29. To carriage 53 are secured the axles of two pulleys 42 and 43. A cable 44, passing in the groove of a pulley 45 and of the two pulleys 42 and 43, is fastened to the end of the jib and is connected to a winch 46 through a pulley 47 whose axle is carried by the mast of the crane. The winch is driven in rotation, for example by motor 27 provided on platform 22 (see FIG. 4). Motor 27 may also be used for driving known means, not shown for providing hydraulic energy to the oleopneumatic jack 31. On the axle of pulley 45 is fastened a support 48 for a electromagnet supplied by a known generator not shown. Cables 50 are secured to the feet of leg 32 and are wound on a winch 51 carried by jib 29 of the crane and driven by a motor 52.

When the vehicle has been driven to the desired location, the jacks 7 are actuated for placing the target member 1 into contact with the earth and to make it solid therewith. Turret 21 (see FIG. 4) is pivoted so as to bring jib 29 of the crane in a vertical plane perpendicular to one of the striking surfaces 19. The winch 51 is actuated so as to rotate the leg 32 and bring it in a vertical plane. The oleopneumatic jack 31 is so adjusted that the feet of the leg 32 come in abutment against the earth.

At the starting moment, after the shock produced against the target member has occurred, the mass 36 is suspended from cables 35 in front of one of the striking surfaces 19 (FIG. 6C). The carriage 53 is displaced along its roller path until it comes to a position vertically above the mass 36. Cable 44 is then unreeled from winch 46 until the electro-magnet 49 be pressed against the upper surface of mass 36 and then rewound to lift the electro-magnet and its load to an upper position. The carriage 53 is then moved, toward the end of jib 29, up to a position (FIG. 6B) where cables 35 are stretched. The shifting and lifting movements of the mass may be combined by simultaneous actuation of the motors. The device is ready for being triggered. At the instant of the shock of the mass against the target member, the pneumatic effect of the oleo-pneumatic jack is used for dampening the rotation motion of the jib about axle 30.

After the mass has been released, several successive operations may be performed at the same place and on the same side of the target-member. It is also possible by action on the oleo-pneumatic jack 31, to lift the end part of the jib resting on leg 32 and to drive in rotation the turret of the crane so as to bring the mass in a plane containing the striking surface of the target-member opposite the first one. One or more "shots" may be performed by striking the latter. The embodiment of FIG. 7 similarly comprises a crane including also a mast 28 and a jib 29. The mass 36 is also suspended from the jib through cables 35. Their fastening points on the jib are, as in the preceding embodiment, substantially straight above the striking surface 19 when the jib is oriented in a vertical plane perpendicular to the striking surfaces.

The system for handling the mass comprises a winch of large diameter 54 having one lateral flange provided with a stop-member 54 A. The winch is driven in rotation by an abutment 55 B, solid with a toothed wheel 55 which abuts against the stop member 54 A. A motor 124 solid with a gear 125, is used for driving in rotation the toothed wheel 55. On the winch 54, is wound up a traction cable passing through the grooves of two pulleys 56 and 57 carried by the jib 29 and fastened to mass 36. The position of pulley 57 is so adjusted that the distance from its rotation axis to the medium plane between the anchoring points of cables 35 on the jib be substantially equal to the length of the latter.

After the mass has struck the target-member, motor 124 is actuated. By rotation of the winch 54, the mass 36 is lifted again and deviated from its rest position until it reaches a position straight down pulley 57. After this position has been reached, the stop-member 54 A, provided on one of the lateral flanges of winch 54, abuts against the surface of an electro-magnet 58. The latter being actuated, the toothed wheel is driven in the reverse direction so as to bring the driving abutment to the position shown on the figure. The device is then ready for being triggered.

In this embodiment the steps of lifting and deviating the mass from its rest position, are combined.

The third embodiment illustrated in FIGS. 8A and 8B comprises a support-member 59 solid with platform 22 and carrying an axle 60 about which is pivotally mounted an elongate element 61 having two parallel arms solid with each other. Between the ends of said arms of element 61 which are opposite to axle 60 is secured a hinge pin 62. A rigid arm 63 carrying the mass 36 at one of its ends is pivotally mounted about pin 62.

On this same pin 62 is keyed a wheel 64 which can be made solid with arm 63 through a detachable cotter pin 65. A rigid cover 66, having an extension 67, is pivotally mounted about pin 62 and made solid with the elongate element 61, through a detachable cotter pin 68. The wheel 64 is solid with a pulley driven in rotation by winch 69, itself driven by a motor 70. The movement of the winch is transmitted to a pulley solid with the wheel 64 through, for example, several belts of trapezoidal section 71. At the end of extension 67 is secured an electro-magnet 72. The arm 63 is provided with a plate 73 destined to be pressed against the surface of the electro-magnet.

By means of a jack 74, whose body is solid with platform 22 and whose rod is solid with the elongate member 61, it is possible to adjust the elevation of the articulation axle 62 so that mass impiges one of the striking surfaces 19 of the target-member at the end of its fall. Jacks 75 solid with the truck framework may be provided for stabilizing platform 22 when the device is in operation.

The mass being in lower position, the arm 63 is rigidly secured to wheel 64 and motor 70 is actuated so as to drive the wheel in rotation until the plate 73 come in contact with the electro-magnet. The electro-magnet is then actuated to rigidly connect the arm 63 to the extension 67 of the cover. It suffices to drive out the cotter pin 65 and then the device is ready to be triggered by de-energizing the electro-magnet. The cotter pins 65 and 68 may be introduced in their housings or driven out therefrom by mechanical, electro-mechanical or pneumatic means of a known type. Several housings for the cotter pin 68 may be arranged in cover 66 so as to adjust the position of the electro-magnet and accordingly to vary the fall of mass 36.

At the end of the operations, the cotter pin 68 is driven out so as to release the rigid connection of cover 66 with element 61 and to make the arm 63 free to rotate to a retracted position (FIG. 8B) where the mass 36, solid with the arm 63, rests on the support-member 59.

The embodiment of FIG. 9 comprises an inclined crane mast 76, pivotable in a vertical plane about an axle 77 solid with platform 22. The crane mast 76 is rigidly connected to rods of jack 78 the bodies of which are solid with platform 22.

The upper portion of the crane mast is partly shaped as a fork whose arms are solid with a transversal axle 79. An arm 80 is pivotable about axle 79. The end of this arm is connected to mass 36 through a block 81 made of elastic material. The arm 80 comprises an extension 82, on the other side of axle 79 with respect to mass 36, the end of which carries a plate 83. An electro-magnet 84 comprising a contact surface for plate 83 is secured on the mast of the crane.

A pulley 85 is pivotally mounted on axle 79. It is driven in rotation by a winch 86 itself driven by a motor 87. The arm 80 is driven in rotation by pulley 85, through a detachable fastening system similar to that shown in FIG. 8. The motion of winch 86 is transmitted to pulley 87, for example through several belts of trapezoidal section 88.

The inclination of the crane mast 76 is so determined that the rotation axle 79 be substantially straight above the striking surface 19 of the target-member. Through jack 78, it is possible to adjust the length of the arm 80 to the height of axle 79 above the earth.

The operation of the device is analogous to that shown in FIGS. 8A and 8B. The rotation of pulley 85, by action of motor 87, drives arm 80 in rotation and lifts the charge up to a position at which the plate 83 comes in abutment against the surface of application of the electro-magnet. The arm is then released from its connection with the pulley and the device is ready to operate.

In the embodiment of FIG. 10, the crane mast 89 may, as in the preceding example, rotate about an axle solid with platform 22, by the action of a jack 90. An axle 91 is carried by the crane mast 89 at the end thereof. A toothed wheel 92 and an arm 93 holding the mass at its end are pivotally mounted on axle 91. A casing 94 is provided to one side of the toothed wheel and is pivotable about axle 91. A toothed rack 95, solid with one end of the rod of jack 96, meshes with a toothed wheel 92 and is maintained in contact therewith by taking its bearing on a groove provided inside casing 94. The device comprises another crane mast 97 at the end of which is secured an electro-magnet 98. The mass comprises a metal surface 99 adapted to contact the surface of the electro-magnet when the mass is in its upper position. The toothed wheel 92 is solid with axle 91 and the arm 93, carrying the hammer, can be made solid with said toothed wheel through a detachable locking element 100.

The toothed wheel 92 and the arm 93 being rigidly connected, the jack 96 is actuated so that the toothed rack 95 makes the mass to pivot up to an upper position where it is maintained by the electro-magnet 98. The toothed wheel is then released from its rigid connection with arm 93 and the device is then ready to be actuated.

A sixth embodiment illustrated in FIGS. 11A to 11F is a modification of the embodiment of FIG. 5. The jib 29 comprises a roller path for a carriage 101. This carriage is driven by means of two cables 102 and 103 secured at the two opposite ends of the carriage and connected, through lazy pulleys 104 and 105, to a driving pulley, not shown. The mass 36 is connected to the two transverse beams 34 by means of cables 35. The mass 36 is also suspended from two cables 106 passing in the grooves of two identical pulleys 107, whose axles are fixed on both sides of the longitudinal axis of the carriage, and in the grooves of lazy pulleys 108 and 109 carried by jib 29 and separated by a distance greater than the stroke of carriage 101. The ends of cables 106 are connected to a rod or compensating bar 110.

Figures 11C, 11D:
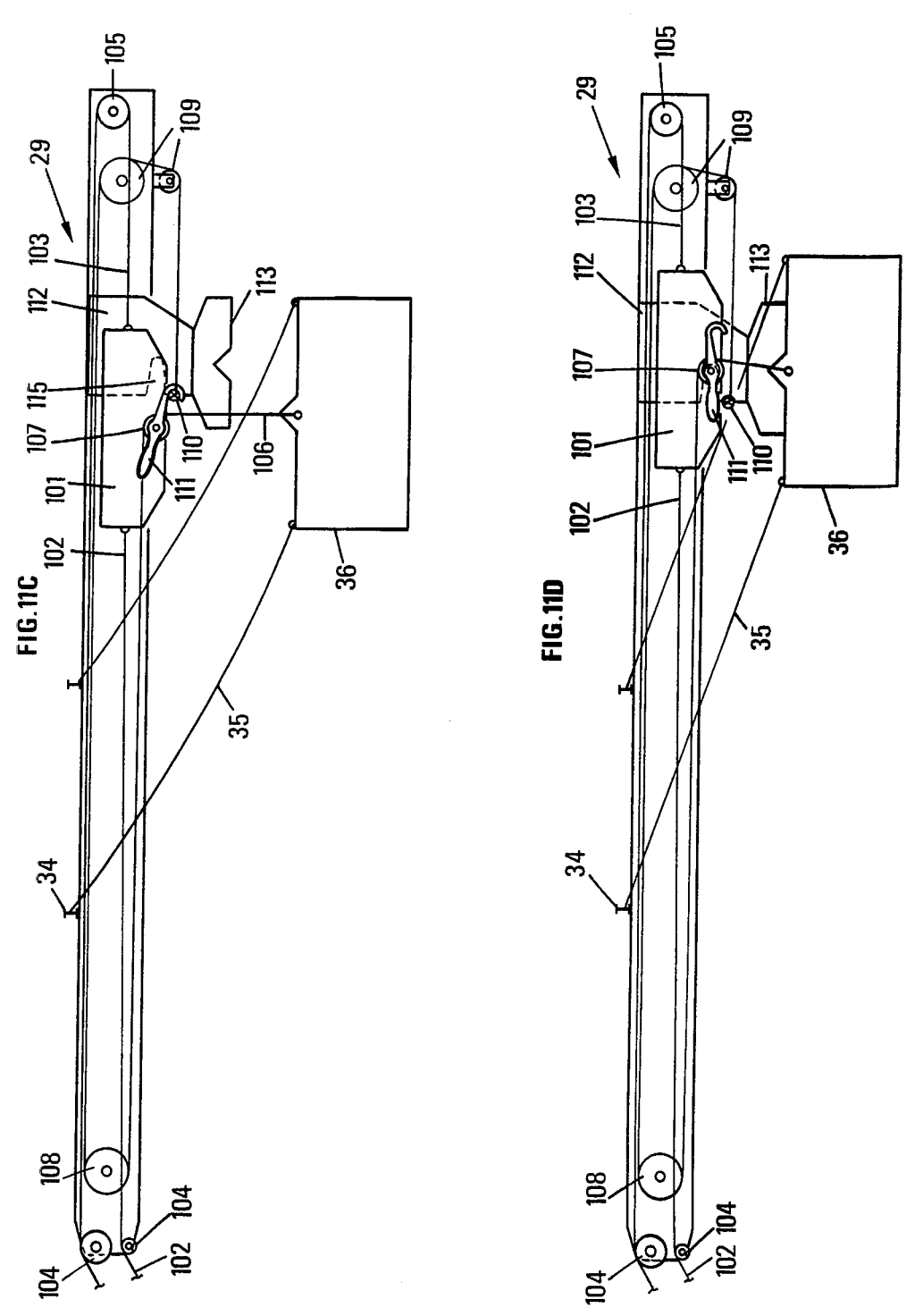

On the axles of pulleys 107 are provided two hooks 111 pivotable between a position at which they can hook rod 110 (FIG. 11A) and a position of disengagement (FIG. 11D). A support member 112 for an electro-magnet 113 is secured to jib 29 at a place laterally shifted with respect to the fastening beams 34. The support member 112 comprises two housings 114 and 115 in which are respectively introduced the rod 110 and the axle of pulleys 107.

The device being in the position shown in FIG. 11A, in which the hook 111 is hooked to rod 110 and the mass 36 suspended, at a certain height, close to the mast 28 of the crane (see FIG. 5), carriage 101 is moved. The length of cable 106 between the pulleys 107 and the rod 110 being constant, the mass 36 is maintained at a constant elevation with respect to the crane jib during the displacement (FIG. 11B) until rod 110 become locked at the bottom of housing 114 provided therefor in support member 112 (FIG. 11C). The rod 110 being locked, a further displacement has the effect of lifting the mass up to a position (FIG. 11D) at which its upper surface is in contact with that of electro-magnet 113. The latter being actuated and the hook being placed in position of disengagement, we move the carriage in the reverse direction up to a position (FIG. 11E) where it is substantially between the two beams 34.

When the hook is in a position of disengagement (FIG. 11F) any displacement of the carriage toward the end of jib 29 of the crane results in a simultaneous lifting of mass 36. Consequently, according to this embodiment, the movements of translation and lifting of the mass toward its triggering position are simultaneous. The mass being in its lower position, it suffices to displace the carriage between the positions illustrated in FIGS. 11E and 11D in order to bring it again to its upper position. In the case where it is desired to momentarily discontinue the operation at a time when the mass is in its upper position, it suffices to overturn the hook 111 to its position of hooking the rod 110. The fall of the mass resulting from its release by the electromagnet is interrupted as soon as the hook hooks the rod (FIGS. 11C or 11F).

At the end of the operation, the device is brought again to its "rest" or "non-working" position (FIG. 11A) by continuing to displace the carriage in the direction of the crane mast.

In the embodiment of FIG. 12, the actuating devices and control means of the mass comprise two parallel arms 126 solid with each other. At one of their ends, they are pivotable about an axle 127 solid with platform 22. At the other one of their ends, they carry an axle on which are pivotally mounted two arms 116 solid with each other and carrying at one of their ends an axle on which are pivotally mounted two arms 117 also solid with each other. The mass 36 is rigidly connected to arms 117 at one of their ends. The arms 126, 116 and 117 are respectively secured to the ends of jack rods 118, 119, 120 sliding in the bodies of jacks 121, 122 and 123, respectively secured onto platform 22 and on arms 126 and 116.

The system of articulated arms is so adjusted that, in lower position, the mass faces one of the striking surfaces 19. The jacks 119-122 for example is then actuated so as to rotate the arm 116 and bring the mass to its upper position. The same jack is then actuated in a reverse direction so as to impart to mass 36 a force whose effect is superimposed to that resulting from the gravity effect.

It would not be outside the scope of the invention to change the number of arms for handling the mass and to replace the jack system by any device capable of imparting to the mass an impulsion whose effect is superimposed to that of gravity.

Irrespective of the selected embodiment, the device is well adapted in view of its mobility abd the rapidity of its working up, to rapid "shot" sequences at successive selective places of a seismic profile on survey. It results in a substantial saving of time and work.

We claim:

1. A device for generating seismic shear waves in the earth comprising a mobile supporting structure to which are secured a target-member having a surface of contact with the earth, a mass for striking the target-member and means for imparting to said mass a speed having a component parallel to said contact surface, including a rigid support-member orientable with respect to said supporting structure, an elongate rigid member supporting the mass at an end thereof and automatic means for moving the mass by rotation of said rigid member with respect to said support-member.

2. A device for generating shear waves in the earth comprising a target-member having a surface of contact with the earth, a mass for striking the target-member and means for imparting to said mass a speed having a component parallel to said contact surface, said means comprising a platform and an arm orientable in a vertical plane and supported by the platform, an elongate rigid member supporting the mass at an end thereof and adapted to rotate about an axle carried on said arm and means for moving the mass comprising a wheel carried on said axle, means for making the arm and the axle intermittently solid in rotation and a driving system comprising a rack solid with a jack, means for maintaining the rack in mesh with said toothed wheel and another mast carried by the platform and provided with an intermittently operated magnet system adapted to hold said mass.

3. A device for generating seismic shear waves in the earth comprising a mobile supporting structure to which are secured a target-member having a surface of contact with the earth, a mass for striking the target-member and means for imparting to said mass a speed having a component parallel to said contact surface, including actuating members, orientable with respect to the target-member, for maintaining the mass in a plane containing the target-member and automatic control means for lifting the mass above the target-member and orienting its fall towards the target-member, wherein said mobile supporting structure is a self-propelling vehicle.

4. A device according to claim 3, wherein the target-member is supported by two arms rigidly connected to the vehicule at one of their ends and driving means for rotating the target-member from a position of contact with the earth to a lifted position.

5. A device according to claim 3, wherein the surface of contact with the earth is provided with nails.

6. A device for generating seismic shear waves in the earth comprising a mobile supporting structure to which are secured a target-member having a surface of contact with the earth, a mass for striking the target-member and means for imparting to said mass a speed having a component parallel to said contact surface, including movable actuating members, orientable with respect to the target-member, for maintaining the mass in a plane containing the target-member automatic control means for lifting the mass above the target-member and orienting its fall towards the target-member and means for imparting an additional force to said mass.

7. A device according to claim 6 wherein said means for applying the force comprises at least one jack.

8. A device for generating shear waves in the earth, comprising a self-propelled vehicle to which are secured a target-member having a surface of contact with the earth, means for pressing the target-member against the earth, a mass for striking the target-member and means for imparting to said mass a speed having a component parallel to said contact surface, said means including movable actuating members, orientable with respect to the target-member, for maintaining the mass in a plane containing the target-member and automatic control means for lifting the mass above the target-member and orienting its fall towards the target-member.

9. A device for generating seismic shear waves in the earth comprising a mobile supporting structure to which are secured a target-member, a mass for striking the target-member and means for imparting to said mass a speed having a component parallel to said contact surface including a rigid support member orientable with respect to said supporting structure, a means for supporting said mass comprising at least a rigid arm pivotably mounted on the support member and jack means for moving the arm with respect to the support-member.

10. A device for generating seismic shear waves in the earth comprising a mobile supporting structure to which are secured a target-member having a surface of contact with the earth, a mass for striking the target-member and means for imparting to said mass a speed having a component parallel to said contact surface, including an orientable rigid support member comprising a beam cooperating with a mast and having anchoring points for cables for maintaining the mass in a plane containing the target-member and automatic driving means for lifting said mass and shifting it laterally with respect to the target-member; said driving means comprising a cable fastened to said mass and bearing on the groove of a lazy pulley provided on the beam and laterally shifted with respect to the target-member, said cable being connected to a traction member carried on said rigid support-member.

11. A device according to claim 10, wherein the traction member comprises a winch, a disconnectable system for driving the winch and the electric magnet system for intermittently maintaining said mass in shifted position.

12. A device according to claim 10, wherein said beam is connected to an articulation axle supported by the mast and in which said support-member comprises a platform connected at one end of said mast through a jack.

13. A device according to claim 12, wherein said jack is an oil pneumatic jack.

14. A device for generating seismic shear waves in the earth comprising a mobile supporting structure to which are secured a target-member having a surface of contact with the earth, a mass for striking the target-member and means for imparting to said mass a speed having a component parallel to said contact surface, including an orientable rigid support member comprising a beam cooperating with a mast and having anchoring points for cables for maintaining the mass in a plane containing the target-member and automatic driving means for lifting said mass and shifting it laterally with respect to the target-member; wherein the driving means comprises a carriage movable on a roller path carried by said beam, means for intermittently holding the mass at a variable height above the target-member and a driving system for varying said height and moving said carriage.

15. A device according to claim 14, wherein the means for intermittently holding said mass comprises an electro magnet system which can be rigidly connected to the mass and a cable co-operating with pulleys and a motor for varying the vertical distance between the carriage and said electro magnet system when the latter is fastened to the mass.

16. A device according to claim 15, wherein the electro magnet system is solid with the axle of pulleys in the grooves of which passes at least one cable rigidly connected to the beam at one of the ends thereof, the other end being connected to a winch actuated by said motor and bearing on pulleys whose axles are solid with the carriage.

17. A device according to claim 14, wherein said beam is connected to an articulation axle supported by the mast and in which said support member comprises a platform connected at one end of the mast through a jack.

18. A device according to claim 14, wherein the means for intermittently holding the mass comprises an electro magnet system solid with said beams and at least one cable rigidly connected to the mass at one of its ends and passing on the groove of a pulley whose axle is solid with the carriage and on the grooves of lazy pulleys whose axles are solid with the beam, said cable being fastened to a rod at its other end.

19. A device according to claim 18, wherein said rod can be rigidly connected to said beam.

20. A device according to claim 18, wheren said rod can be rigidly connected to the carriage through a retractable hook.

21. A device for generating seismic shear waves in the earth comprising a mobile supporting structure to which are secured a target-member having a surface of contact with the earth, a mass for striking the target-member and means for imparting to said mass a speed having a component parallel to said contact surface, including an orientable rigid support member comprising a beam cooperating with a mast and having anchoring points for cables for maintaining the mass in a plane containing the target-member and automatic driving means for lifting said mass and shifting it laterally with respect to the target-member wherein the beam is connected, at one of the ends thereof, to a retractable leg.

22. A device for generating shear waves in the earth comprising a target-member having a surface of contact with the earth, a mass for striking the target-member, an orientable rigid support-member comprising a platform and an arm orientable in a vertical plane and supported by the platform, an elongate rigid member supporting the mass at the end thereof and adapted to rotate about an axle carried on said arm, and means for moving the mass comprising a wheel carried on said axle, means for making said arm and said wheel intermittently solid in rotation and a system for driving said wheel.

23. A device according to claim 22, comprising a support-member adapted to rotate about the axle carried by said arm and carrying a magnet-system adapted to support intermittently the rigid element and a detachable member for rigidly connecting the arm of the support-member.

24. A device according to claim 22, comprising a magnet-system for intermittent actuation and wherein said rigid element has an extension provided with a surface for contact with the electro-magnet.

25. A device according to claim 22, wherein said wheel is a pulley connected to the driving system through a set of belts.

* * * * *